(12) United States Patent
Ross

(10) Patent No.: US 7,752,418 B2
(45) Date of Patent: Jul. 6, 2010

(54) SPLASH TABLES: AN EFFICIENT HASH SCHEME FOR PROCESSORS

(75) Inventor: Kenneth Andrew Ross, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 198 days.

(21) Appl. No.: 12/136,017

(22) Filed: Jun. 9, 2008

(65) Prior Publication Data

US 2008/0235488 A1   Sep. 25, 2008

Related U.S. Application Data

(62) Division of application No. 11/455,339, filed on Jun. 19, 2006, now Pat. No. 7,424,591.

(51) Int. Cl.
*G06F 12/00* (2006.01)
(52) U.S. Cl. .................. 711/216; 711/108; 711/164
(58) Field of Classification Search ............... None
See application file for complete search history.

(56) References Cited

U.S. PATENT DOCUMENTS

| | | | | |
|---|---|---|---|---|
| 4,996,663 | A | | 2/1991 | Nemes |
| 4,996,665 | A | * | 2/1991 | Nomura ............... 707/200 |
| 5,287,499 | A | * | 2/1994 | Nemes ................. 707/2 |
| 5,579,501 | A | * | 11/1996 | Lipton et al. ........... 711/216 |
| 6,014,733 | A | * | 1/2000 | Bennett ............... 711/216 |
| 6,097,725 | A | * | 8/2000 | Glaise et al. ........ 370/395.32 |
| 6,292,880 | B1 | | 9/2001 | Mattis et al. |

2007/0234005 A1 * 10/2007 Erlingsson et al. ........ 711/216

OTHER PUBLICATIONS

Dietzfelbinger et al., "Balanced Allocation and Dictionaries with Tightly Packed Constant Size Bins", Jul. 18, 2005, pp. 1-23, ICALP, LNCS 3580.
Erlingsson et al., "A Cool and Practical Alternative to Traditional Hash Tables", Microsoft Research—Silicon Valley, Workshop on Distributed Data and Structures, 2006, pp. 1-6.
Fotakis et al., "Space Efficient Hash Tables With Worst Case Constant Access Time", Theory Comput. Syst., 38 (2):229-248, 2005.
Pagh et al., "Cuckoo Hashing", J. Algorithms, 51 (2): 122-144, 2004.
Panigrahy, "Efficient Hashing with Lookups in Two Memory Accesses", Mar. 23, 2006, Cisco Systems, pp. 1-12.

* cited by examiner

*Primary Examiner*—Jack A Lane
(74) *Attorney, Agent, or Firm*—Yee & Associates, P.C.; Preston J. Young

(57) ABSTRACT

A computer implemented method, data processing system, and computer usable program code are provided for storing data items in a computer. A plurality of hash functions of data values in a data item are computed. A corresponding memory location is determined for one of the plurality of hash functions. The data item and a key portion and a payload portion of all data items are stored contiguously within the memory location.

Also provided for are retrieving data items in a computer. A plurality of hash functions of data values in a probe key are computed. A corresponding memory location is determined for each of the plurality of hash functions. Data items in each memory location are examined to determine a match with the probe key. Responsive to a match, a payload of the matching stored data item is returned. All of the steps are performed free of conditional branch instructions.

3 Claims, 11 Drawing Sheets

FIG. 1
(PRIOR ART)
```
h = hash(key) % TableSize;
m = &table[h]; // m points to a hash
               // bucket of size S
do {
   for(i=0 ; i <m->keys_in_bucket; i++){
      if(m->key[i]==key)
         return m->payload[i]; }
   m = m->next_bucket;
} while (m !=NULL);
return 0;
```
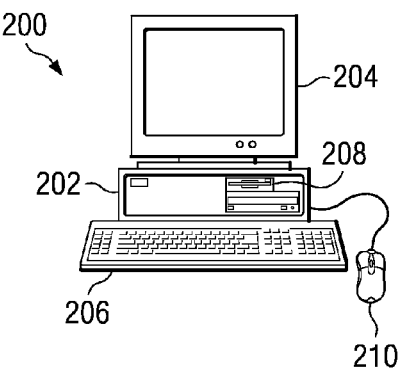
FIG. 2
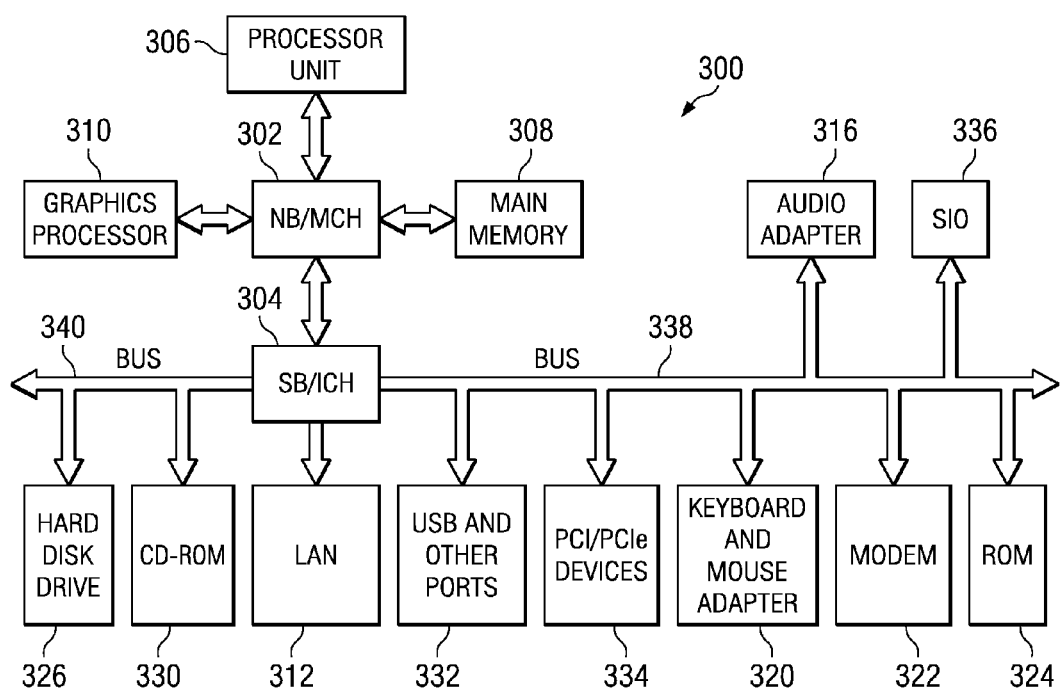
FIG. 3

| B | H | THRESHOLD |
|---|---|---|
| 2 | 2 | 0.89 |
| 4 | 2 | 0.976 |
| 4 | 3 | 0.998 |
| 4 | 4 | 0.9997 |
| 8 | 2 | 0.997 |

|   | K1 | K2 |
|---|----|----|
| 0 | 6  |    |
| 1 | 1  | 17 |
| 2 | 12 | 24 |
| 3 | 73 |    |
| 4 | 46 |    |
| 5 | 75 | 54 |
| 6 | 68 |    |
| 7 | 57 |    |
| 8 | 84 |    |
| 9 | 99 | 91 |

|   | K1 | K2 |
|---|----|----|
| 0 | 6  | 1  |
| 1 | 17 | 91 |
| 2 | 12 | 24 |
| 3 | 73 |    |
| 4 | 46 |    |
| 5 | 75 | 54 |
| 6 | 68 |    |
| 7 | 57 |    |
| 8 | 84 |    |
| 9 | 59 | 99 |

|   | K1 | K2 |
|---|----|----|
| 0 | 6  | 1  |
| 1 | 17 | 91 |
| 2 | 12 | 24 |
| 3 | 73 |    |
| 4 | 46 | 41 |
| 5 | 75 | 54 |
| 6 | 68 | 60 |
| 7 | 57 | 79 |
| 8 | 84 | 87 |
| 9 | 59 | 99 |

SPLASH TABLES: AN EFFICIENT HASH SCHEME FOR PROCESSORS

This application is a divisional of application number Ser. No. 11/455,339, filed Jun. 19, 2006, now U.S. Pat. No. 7,424,591.

BACKGROUND OF THE INVENTION

1. Field of the Invention

The present invention relates generally to an improved data processing system and in particular to a method and apparatus to locate data based on a key value. Still more particularly, the present invention relates to a computer implemented method, apparatus, and computer usable program code for an efficient hashing scheme.

2. Description of the Related Art

Many applications, such as databases, networking, and language models, require efficient lookup of a data item/record given some identifying key. Ideally, the efficient lookups should be fast, and the space used for storing the items/records should be as small as possible.

Hashing is a commonly used technique for providing access to data based on a key in constant expected time. Hashing is used in database systems for joins, aggregation, duplicate-elimination, and indexing. In a database context, hash keys are typically single column values or a tuple of values for a small number of columns. Payloads in a hash table may be full records, pointers, or record identifiers, to records, or they may represent values of an aggregate computed using hash aggregation.

FIG. 1 shows pseudo-code for a hash probe operation on a bucketized hash table with separate chaining. The code shown in FIG. 1 assumes that the hash table contains no duplicate keys and that zero is not a valid payload value.

Thus, conventional hash tables perform poorly, in terms of time required for hashing, on processors due to branch mispredictions, cache misses, and poor instruction-level parallelism. Conventional hash tables also have space overheads. Prior hashing schemes based on cuckoo hashing have been proposed to solve hashing scheme issues, most of which address only the space issue. Cuckoo hashing is a scheme in computer programming that allows a key to be placed in one of several locations in the hash table. In cuckoo hashing, it is possible to get over 99 percent space efficiency for some configurations. That is, 99 percent of the space used is occupied by actual items/records.

Schemes based on cuckoo hashing need to compute multiple hash functions, and look in multiple slots of the hash table. It was therefore assumed that such a scheme would be less time-efficient than conventional hashing that uses one hash function and usually looks in one slot. Prior implementations of an extended cuckoo-hashing scheme require 1900 cycles/probe on a Pentium® 4 processor.

SUMMARY OF THE INVENTION

The different aspects of the illustrative embodiments provide a computer implemented method, data processing system, and computer usable program code for storing data items in a computer. The illustrative embodiments compute a plurality of hash functions of data values in a data item. The illustrative embodiments determine a corresponding memory location for one of the plurality of hash functions of data values in the data item. The illustrative embodiments store the data item in the memory location. Each memory location in the illustrative embodiments stores a plurality of stored data items. Lastly, the illustrative embodiments store a key portion of all data items and a payload portion of all data items contiguously within the memory location.

Alternative aspects of the illustrative embodiments provide a computer implemented method, data processing system, and computer usable program code for retrieving data items in a computer. The illustrative embodiments compute a plurality of hash functions of data values in a probe key. The illustrative embodiments determine a corresponding memory location for each of the plurality of hash functions of data values in the probe key. The illustrative embodiments examine stored data items in each memory location to determine a presence of a match with the probe key, where each memory location stores a plurality of stored data items. Lastly, the illustrative embodiments return a payload of the matching stored data item in response to a match between a stored data item and the probe key. All of the steps of the illustrative embodiments of the probe operation are free of conditional branch instructions.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 shows pseudo-code for a hash probe operation on a bucketized hash table with separate chaining;

FIG. 2 depicts a pictorial representation of a data processing system in which illustrative embodiments may be implemented;

FIG. 3 depicts a block diagram of a data processing system in which illustrative embodiments may be implemented;

DETAILED DESCRIPTION OF THE PREFERRED EMBODIMENT

Figures 4, 5A, 5B, 5C, 9:
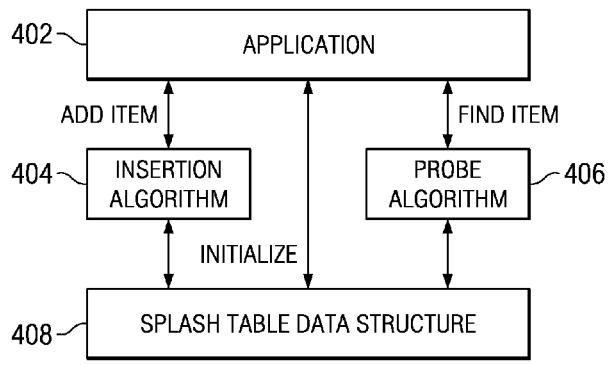
FIG. 4 depicts a block diagram of the components to create an efficient hash scheme for processors in accordance with an illustrative embodiment.
FIGS. 5A, 5B, and 5C depict exemplary splash tables in accordance with an illustrative embodiment.
FIG. 9 shows the failure threshold in accordance with an illustrative embodiment.

The illustrative embodiments provide an efficient hash scheme for processors. With reference now to the figures and in particular with reference to FIG. 2, a pictorial representation of a data processing system is shown in which illustrative embodiments may be implemented. Computer 200 is depicted which includes system unit 202, video display terminal 204, keyboard 206, storage devices 208, which may include floppy drives and other types of permanent and removable storage media, and mouse 210. Additional input devices may be included with personal computer 200, such as, for example, a joystick, touchpad, touch screen, trackball, microphone, and the like. Computer 200 may be any suitable computer, such as an IBM® eServer™ computer or IntelliStation® computer, which are products of International Business Machines Corporation, located in Armonk, N.Y. Although the depicted representation shows a personal computer, other embodiments may be implemented in other types of data processing systems, such as a network computer. Computer 200 also preferably includes a graphical user interface (GUI) that may be implemented by means of systems software residing in computer readable media in operation within computer 200.

With reference now to FIG. 3, a block diagram of a data processing system is shown in which illustrative embodiments may be implemented. Data processing system 300 is an example of a computer, such as computer 200 in FIG. 2, in which code or instructions implementing the processes of the illustrative embodiments may be located. In the depicted example, data processing system 300 employs a hub architecture including a north bridge and memory controller hub (MCH) 302 and a south bridge and input/output (I/O) controller hub (ICH) 304. Processor 306, main memory 308, and graphics processor 310 are coupled to north bridge and memory controller hub 302. Graphics processor 310 may be coupled to the MCH through an accelerated graphics port (AGP), for example.

In the depicted example, local area network (LAN) adapter 312 is coupled to south bridge and I/O controller hub 304 and audio adapter 316, keyboard and mouse adapter 320, modem 322, read only memory (ROM) 324, universal serial bus (USB) ports and other communications ports 332, and PCI/PCIe devices 334 are coupled to south bridge and I/O controller hub 304 through bus 338, and hard disk drive (HDD) 326 and CD-ROM drive 330 are coupled to south bridge and I/O controller hub 304 through bus 340. PCI/PCIe devices may include, for example, Ethernet adapters, add-in cards, and PC cards for notebook computers. PCI uses a card bus controller, while PCIe does not. ROM 324 may be, for example, a flash binary input/output system (BIOS). Hard disk drive 326 and CD-ROM drive 330 may use, for example, an integrated drive electronics (IDE) or serial advanced technology attachment (SATA) interface. A super I/O (SIO) device 336 may be coupled to south bridge and I/O controller hub 304.

An operating system runs on processor 306 and coordinates and provides control of various components within data processing system 300 in FIG. 3. The operating system may be a commercially available operating system such as Microsoft® Windows® XP (Microsoft and Windows are trademarks of Microsoft Corporation in the United States, other countries, or both). An object oriented programming system, such as C or C++ programming systems, may run in conjunction with the operating system and provides calls to the operating system from applications executing on data processing system 300 (Java and all Java-based trademarks are trademarks of Sun Microsystems, Inc. in the United States, other countries, or both).

Instructions for the operating system, the object-oriented programming system, and applications or programs are located on storage devices, such as hard disk drive 326, and may be loaded into main memory 308 for execution by processor 306. The processes of the illustrative embodiments may be performed by processor 306 using computer implemented instructions, which may be located in a memory such as, for example, main memory 308, read only memory 324, or in one or more peripheral devices.

The hardware in FIGS. 2-3 may vary depending on the implementation. Other internal hardware or peripheral devices, such as flash memory, equivalent non-volatile memory, or optical disk drives and the like, may be used in addition to or in place of the hardware depicted in FIGS. 2-3. Also, the processes of the illustrative embodiments may be applied to a multiprocessor data processing system.

In some illustrative examples, data processing system 300 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 308 or a cache such as found in north bridge and memory controller hub 302. A processing unit may include one or more processors or CPUs. The depicted examples in FIGS. 2-3 and above-described examples are not meant to imply architectural limitations. For example, data processing system 300 also may be a tablet computer, laptop computer, or telephone device in addition to taking the form of a PDA.

The illustrative embodiments provide for a computer implemented method, apparatus, and computer usable program code for an efficient hash scheme for processors. One aspect of the illustrative embodiments provide for storing data items in a computer. A plurality of hash functions of data values in a data item is computed. A corresponding memory location is determined for one of the plurality of hash functions of data values in the data item. Lastly, the data item is stored in the memory location. Each memory location in the illustrative embodiments stores a plurality of stored data items.

An alternative aspect of the illustrative embodiments provides for retrieving data items in a computer. A plurality of hash functions of data values in a probe key is computed. A corresponding memory location is determined for each of the at least two hash functions of data values in the probe key. The stored data items in each memory location are examined to determine a presence of a match with the probe key, where each memory location stores a plurality of stored data items. Lastly, a payload of the matching stored data item is returned in response to a match between a stored data item and the probe key. The methods for the different aspects may be performed in a data processing system, such as computer 200 shown in FIG. 2 or data processing system 300 shown in FIG. 3.

FIG. 4 depicts a functional block diagram of the components used to create an efficient hash scheme for processors in accordance with an illustrative embodiment. Application 402 is a computer application that may run on a data processing system such as data processing system 300 of FIG. 3. Application 402 uses insertion algorithm 404 to add items and probe algorithm 406 to find items in splash table data structure 408. Splash table data structure 408 may be a data structure within a computer memory, such as main memory 308 of FIG. 3. The information in splash table data structure 408 may be used to initialize application 402. Splash table data structure 408 may be a flat file, an array or a hash table as in the illustrative embodiments.

When using conventional hashing in a processor, such as processor 306 of FIG. 3, a bucket size, such as the bucket size S shown in FIG. 1, would be chosen to match the cache-line size of the processor, so that each bucket access generates just one cache miss. When accesses to the hash table and overflow buckets are accesses to random access memory (RAM), the cost of those accesses is significant. In processors, an L2 (or L3) cache miss may have a latency of several hundred cycles, although some of that latency may be overlapped with other work. Other cost factors include:

1. The cost of computing the hash function.
2. The cost of the modulus operation by the table size. Division and remainder operations are expensive (tens of cycles) on processors. While remainders modulo powers of 2 are cheap to compute, forcing a hash table to have size a power of 2 will potentially waste a lot of space.
3. Branch mispredictions in the for loop. Branch mispredictions may cost 20-30 cycles for machines with long pipelines. The for loop will likely have at least one misprediction for the final iteration, and perhaps more. This loop cannot be fully unrolled, because the loop cardinality is variable (and relatively small).
4. Branch mispredictions in the if test.
5. Branch mispredictions in the while loop.

As identified experimentally, there are other, more subtle cost issues that need to be considered as well. In addition to the time taken for probing a hash table, hash tables may be measured according to the space they consume. A chained hash table has to devote some space to bucket pointers, and also suffers some space penalty due to internal fragmentation when buckets are partially full. A user could avoid some of these space issues by using an open addressing scheme with linear or quadratic probing, or double hashing to find alternative slots for a hash key. However, when space utilization becomes high, the cost of a search becomes prohibitively high. Space utilization is considered to be high in these examples when the load factor $\alpha$ is close to 1. In these illustrative examples the cost of the search is a value that is proportional to $1/(1-\alpha)$. Further, deletions in these open addressing schemes are complex.

The illustrative embodiment provides an open addressing hash scheme based on d-ary cuckoo hashing that avoids most of these time and space problems. The described data structure, which is called "splash table" data structure 408 has the following characteristics:

1. Probes always take a fixed, constant time, and access a small fixed number of cache lines, typically 2, 3, or 4, depending on the parameters chosen.
2. Probes do not incur any branch mispredictions, because they have no branch instructions.
3. Hash computations may be performed efficiently, and no modulus or division operations are required.
4. Hash buckets do not need any information beyond keys and payload data.
5. Deletions from the hash table are simple.
6. As with other open addressing hash schemes, a user needs an estimate of the number of elements to be inserted into the hash table in order to choose a feasible table size.

The illustrative embodiments use multiplicative hashing as the hash function. Multiplicative hashing has several important properties for illustrative purposes:

1. It is universal.
2. It may be computed very efficiently on most computer architectures.
3. If the identifying keys form an arithmetic progression, as might be expected for automatically-generated primary keys, then hash values are even more balanced than randomly generated values.
4. It is amenable to vectorization, so that multiple hash functions may be computed at once.

A 32-bit hash value v may be interpreted as a binary fraction, i.e., the representation of a number between zero and one whose digits after the (binary) decimal point are given by v. Given a hash table size s, the CPU may compute a slot number by multiplying s and v and shifting right 32-bits. Computing s*v may be performed with one 32-bit multiplication, generating a 64-bit result. If s is a 16-bit number, as might be expected for a small hash table, then two 16-bit multiplications, a shift, and a 32-bit addition suffice.

This multiplication of a "hash fraction" by a table size also has benefits when a hash table needs to be rebuilt, as will be described later.

The illustrative hashing scheme is based on the concept of balanced allocations. Insertion algorithm 404 operates as follows. A key is hashed according to H hash functions, leading to H possible locations in the table for that key. During build-time, an element or data item is placed in the least loaded available bucket, with ties broken arbitrarily. This scheme leads to a distribution of keys that is much more balanced than a conventional hash table.

The choice of bucket size B and table size will be described later. When the table is close to full, the system may encounter a key whose H candidate buckets are all full. In that case, a re-insertion procedure is followed similar to one defined (for B=1 and d=H) for d-ary cuckoo hashing. A bucket b is chosen at random from among the candidates, removing the key that had been inserted earliest from that bucket, and the original key is placed in b. The removed key is then inserted into one of its H−1 remaining candidate buckets. If all of these buckets are full, the process is repeated recursively.

If, after some large number of recursive insertions, there is still no room for the key, then the build operation fails.

When all insertions have been completed without failure, hash buckets that are not full are padded with keys that are hash-mismatches according to all H hash functions. These padding keys can never be returned as successful matches.

As an example of the re-insertion operation and with reference to FIGS. 5A, 5B, and 5C which depict exemplary splash tables, such as splash table data structure 408 of FIG. 4, in accordance with an illustrative embodiment, consider a splash table with N=10 buckets and B=2 entries per bucket. FIGS. 5A, 5B, and 5C show just the keys; the illustrative aspects assume that the payloads are inserted and moved along with the keys. For ease of exposition, assume that the two hash functions are $h_1(x)=x \%10$ and $h_2(x)=(x/10)\%10$, where % is integer modulus and/is integer division. Thus, for a two-digit decimal number, the slots it maps to are precisely the digits of its representation. (In practice, multiplicative hashing would be used, as previously described.) Suppose that the insertion algorithm, such as insertion algorithm 404 of FIG. 4, inserts the keys 1, 12, 57, 73, 99, 91, 6, 46, 24, 17, 68, 84, 75, and 54 into the table in sequence. Key 1 may go in slots 1 or 0, both of which have count 0. Supposing that slot 1 is chosen. Key value 12 may then go in slots 2 or 1. Since slot 1 has a count of 1 and slot 2 has a count of 0, slot 2 is chosen. After the complete sequence of insertions, a table such as that shown in FIG. 5A might be reached, without any re-insertions. In FIG. 5A, the earlier insertion is in the K1 column, and the later insertion is in the K2 column.

In order to insert key 59, slots 5 and 9 are both full. Thus, the insertion algorithm chooses one slot arbitrarily (say slot 9), removing the oldest key (99), and insert 59 into the table. Value 91 moves from the K2 position to the K1 position and 59 is placed in the K2 position. The insertion algorithm now re-inserts value 99 into the table. Key 99 hashes to slot 9 according to both hash functions, and, thus, is re-inserted it into slot 9, and remove the key 91. Since key 91 came from slot 9, the insertion algorithm attempts to insert key 91 into its alternate slot, namely slot 1. Slot 1 is full, thus, key 91 is inserted and key 1 is removed for re-insertion. Key 1 fits in slot 0, and the operation is done. The resulting table is shown in FIG. 5B.

To continue with the example, values 41, 60, 79, and 87 are inserted to get the table shown in FIG. 5C. The table is almost full: only one slot remains. (If there were to be no more insertions, slot 3 would be padded by the insertion algorithm with a hash mismatch, such as 0, and be done.) If a key were to be inserted that maps to slot 3, then 100 percent occupancy could be achieved in this example. On the other hand, inserting any key that does not map to slot 3 will cause a failure for this example, because there is only one key in the whole dataset that maps to slot 3. Thus, the re-insertion process would (if not terminated after a threshold) go on indefinitely.

This illustrative embodiment does not guarantee that a splash table may be built. If a user has knowledge of the hash functions, the user could devise a set of keys that never map to, for example, the first half of the hash table according to any of the H hash functions. This would cause a hash table build to fail if the number of records to be inserted was more than half of the table's capacity.

There are two reasons why a user should not be concerned about this possibility of failure. First, the illustrative embodiments use a class of hash functions that are universal. If a hash function is chosen randomly from a universal class, then a user cannot create a degenerate dataset without knowledge of the particular function used. More practically, if for some reason a particular hash function behaves poorly for a given dataset, a new hash function may be chosen that will almost certainly behave well.

Second, the illustrative embodiments choose the size of the hash table so that there is enough space for recursive insertions to eventually find room in the hash table. Certain aspects derive these size estimates empirically in subsequent sections. It turns out that even at 95-99 percent occupancy (depending on various parameters), the procedure outlined above succeeds with probability essentially 1. There is a "thresholding" behavior in which builds almost always succeed when the load is below a threshold t, but almost always fail when the load is even slightly higher than t. The thresholding behavior is described later.

By padding partially-full buckets, the probe algorithm, such as probe algorithm 406 of FIG. 4, compares all keys in a loop whose cardinality is fixed and may therefore be completely unrolled. Since most buckets will be completely full, there will be little wasted work for buckets that are not full.

It is possible that occasionally two or more of the H hash functions return the same slot of the hash table, as shown with key 99 in FIG. 5. This is undesirable because it gives less flexibility for the placement of some keys. A user may avoid this behavior by adding code to the hash functions so that duplicates are not generated. However, this code would add to the cost of both probes and builds. For large enough hash tables, slot collisions of this kind are rare, and so, the hash functions provide no special provision to avoid duplicate hash slots among the H hash values.

The insertion algorithm (but not the probe algorithm) needs to determine which of H buckets is least loaded. A track of the number of valid keys in each bucket may be kept within the data structure itself. While this is the most straightforward alternative, it is not ideal because it imposes both a memory overhead and a potential additional source of cache misses.

If one "invalid" key is set aside, then that key may be used to pad empty slots in a bucket. A single instruction multiple data (SIMD) compare operation against a vector of invalid keys generates a mask of zeroes and ones for each candidate bucket. Since bucket slots are filled from left to right, the insertion algorithm simply compares these masks with each other. The masks with the most one bits (i.e., the masks with the leftmost one bits) represent the least full buckets.

A user may use this idea even without a special invalid key. With multiplicative hashing, the zero key always maps to bucket zero. Thus, a key value of zero may be used as the special value in all buckets other than bucket zero, as above. A special count processing may need to be performed for bucket zero, using a different (hash-function dependent) invalid key. Inserting into bucket zero may be slightly more expensive due to a branch misprediction in identifying the special case. Nevertheless, for a large hash table insertions into any single bucket are rare.

If a splash table grows to the point that an insertion fails or the table is full, then a rebuild algorithm may rebuild a larger splash table using a sequential scan of the old and new tables. For example, if the size of the splash table is multiplied by 2, then bucket b in the old table will map to buckets 2b and 2b+1 in the new table. The scanning behavior is not specific to a multiplier of 2; it holds as long as the table slot is computed by multiplying a "hash fraction" by the table size, as described previously. For non-integer growth factors, there may be a small number of elements that do not fit in their new destination buckets, and have to be re-inserted. The same scanning behavior also applies to rebuilding a smaller table, which might be initiated when the load factor drops below a given threshold.

The advantage of this scanning behavior is that it avoids a large number of cache misses, as sequential scans are easy to prefetch; prefetching of sequential scans is done in hardware on the Pentium® 4. For example, a rebuilding implemented on a 1.8 GHz Pentium® 4, resulted in a 95 percent full splash table with B=4, H=2, and 2,000,000 slots rebuilt into a table of twice the size in about half a second.

The probe algorithm is described as follows. Given a hash table constructed as above, the probe algorithm needs to compute H hash functions and consult H slots of the hash table. For each slot, the algorithm compares each of the B keys against the search key for each slot, and returns the payload of a match if one was found. In the example previously described, a probe for key 27 would require looking in slots 2 and 7, and comparing all keys in these slots with 27.

Because the illustrative embodiments always provides the same number of comparisons, loop unrolling allows an avoidance of branch mispredictions for the for and while loops of the probe implementation above.

Branch mispredictions may also be avoided in the if test by converting the control dependency into a data dependency. A comparison operation generates a mask that is either all 0's (no match) or all 1's (a match). Such mask-generating comparisons are in the instruction sets of processors. The mask may be applied to each of the payloads, with the results ORed together. Since there are no duplicate keys, at most, one of the disjuncts will be nonzero. An unsuccessful match returns zero.

A hash bucket is organized as follows. B keys are stored contiguously, followed by B contiguous payloads. This arrangement allows us to use SIMD operations to compare keys and process payloads. For example, if a SIMD register is 128 bits long (as in the Cell Broadband Engine™ (BE) synergistic processor element (SPE) and using streaming SIMD extensions (SSE) on the Pentium® 4) then four 32-bit keys or four 32-bit payloads may be processed in parallel using a single machine instruction. As a result, a good choice for B would be a small multiple of 4. Further, when B=8 the total size of a bucket is 64 bytes, which fits within the typical L2 cache line of processors. Thus, there would be no more than H cache-line accesses.

Figure 6:
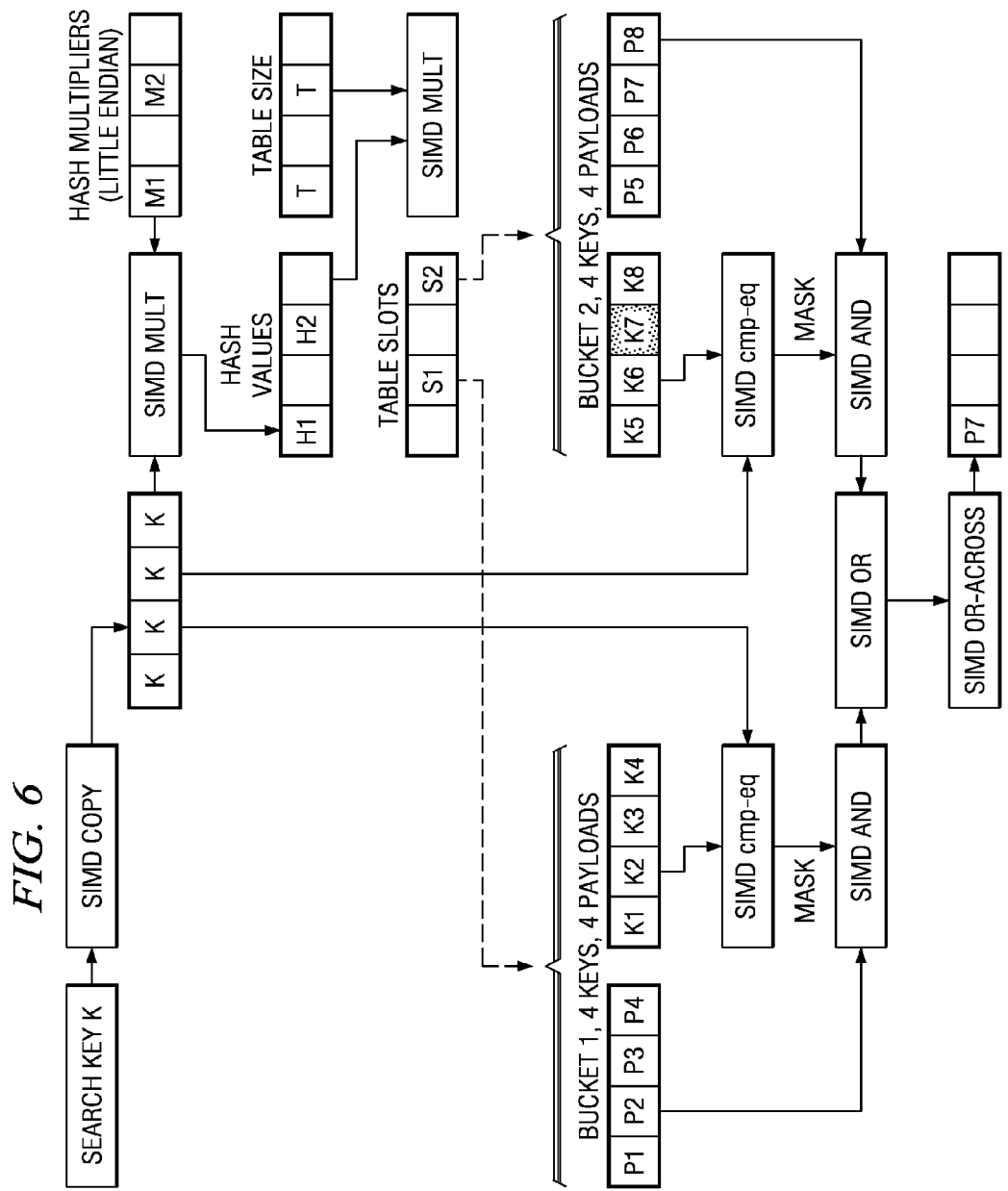
FIG. 6 depicts a flowchart for the vectorized probe algorithm using generic SIMD instructions in accordance with an illustrative embodiment.

A flowchart for the vectorized probe algorithm is given in FIG. 6 for H=2 and B=4, using generic SIMD instructions that are close to the Pentium® 4's SSE2 instructions in accordance with an illustrative embodiment. Solid lines represent the flow of data, usually in 128-bit vectors, while dashed lines represent a memory reference. If key K7 matches the probe K, then the output contains payload P7 in the leftmost SIMD slot.

SSE2 only supports the direct extraction of 16-bit values from vectors. The extract operation (to get the slot number out of the SIMD vector to perform the memory reference) may thus be directly implemented in one instruction on the Pentium® 4 if the table size fits in 16 bits. Otherwise, two extractions, a shift and an OR (or a store to memory followed by a load) are required.

When specialized for the Cell BE SPE, the code is similar to that for the Pentium® 4. The Cell BE SPE does not directly support 32-bit multiplication, and so the hash function has to simulate 32-bit multiplication using 16-bit multiplication. On the other hand, using 16-bit multiplication allows the simultaneous creation of four hash values in a single vector rather than two, which is useful for H>2.

The or_across operation is directly supported by the Cell BE SPE instruction set; the SPE version takes one instruction where the Pentium® 4 version needs four.

As an example of a build process for splash tables, a focus is made on how loaded the table may become before the build fails. In these examples, 10,000 builds are performed using a new random dataset and new random odd hash multipliers for each build.

For a first analysis, the probability is examined that the table could be made completely full, i.e., that the build process did not fail, and every slot in the table was used. B=4 and B=8 are examined because these correspond to natural SIMD widths for the probe step. The variable N denotes the number of buckets in the table; the maximum number of entries that may be inserted is NB.

Figure 7:
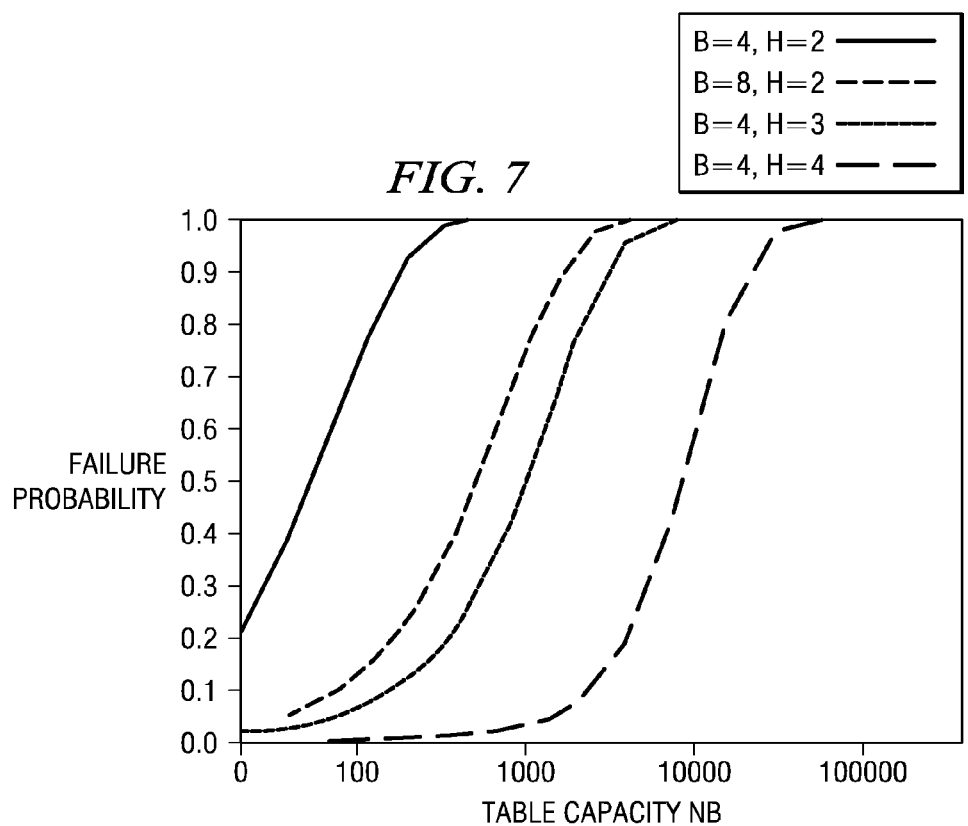
FIG. 7 shows the probability of failure in accordance with an illustrative embodiment.

FIG. 7 shows the probability of failure as a function of NB for several combinations of B and H in accordance with an illustrative embodiment. For very small tables, the probability of failure is relatively small. Thus, if complete table occupancy is the goal, a user could repeat the build process with randomly generated hash multipliers, and with high probability achieve a completely full table with a small number of build attempts. Since the table is small, each build is likely to be cheap. Thus, for small datasets, splash tables may provide functionality analogous to minimal perfect hashing.

As the table becomes larger, the failure probability becomes essentially 1. Thus, for larger tables, there is no expectation to achieve a completely full table.

A more modest goal than complete occupancy is to target a load factor $\alpha$ to be achieved during the build. Based on stored statistics determined in advance, the build algorithm attempts to determine reasonable values of $\alpha$ for various values of B, H, and N. To compute these stored statistics empirically, many runs of the splash table build algorithm were run. During such build experiments, the statistics computation makes a note of exactly when a build fails. For example, if a build fails when inserting the $901^{st}$ element of a table with capacity 1000, then the build is said to fail at load 900/1000=0.9. Among 10,000 experiments, the statistics computation measures the 0.001, 0.5, and 0.9 quantiles of the failure load. If the 0.001 quantile of the failure load is 0.9, that means that a build process that aims to fill the table to 90% of capacity has a failure frequency in experiments of 0.001.

Figure 8:
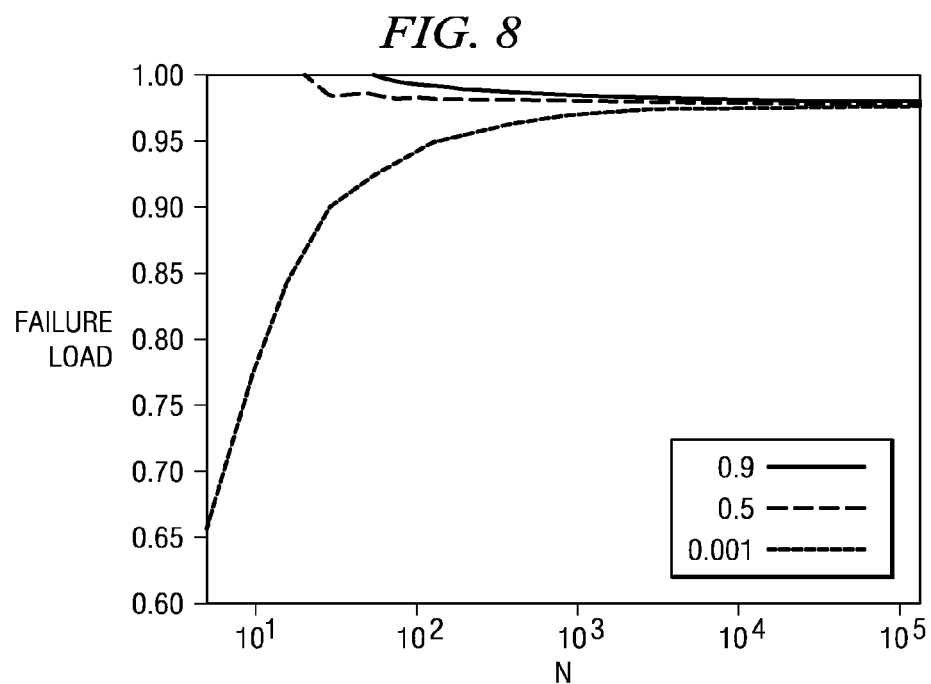
FIG. 8 shows the failure load quantiles in accordance with an illustrative embodiment.

FIG. 8 shows the failure load quantiles for B=4 and H=2 in accordance with an illustrative embodiment. For large N, the three quantiles converge, illustrating a thresholding behavior. At N=64000, corresponding to a table of total size 2000 KB, the 0.001-quantile is 0.976, the 0.5-quantile is 0.978, and the 0.9-quantile is 0.979. In other words, if you wanted to insert 249,846 (i.e., 0.976*64000*4) elements into a splash table with B=4 and H=2, a user could create a table with a capacity of 256,000 elements and fail less than one time in a thousand. Because of the thresholding behavior, a load even slightly below 0.976 would give a failure probability of essentially zero. For smaller values of N, the 0.001 quantile exceeds 0.9 for N≧50, and it exceeds 0.95 for N≧200. The thresholds for large N for various configurations are given in FIG. 9. FIG. 9 shows the failure threshold for various B and H in accordance with an illustrative embodiment.

Figure 10:
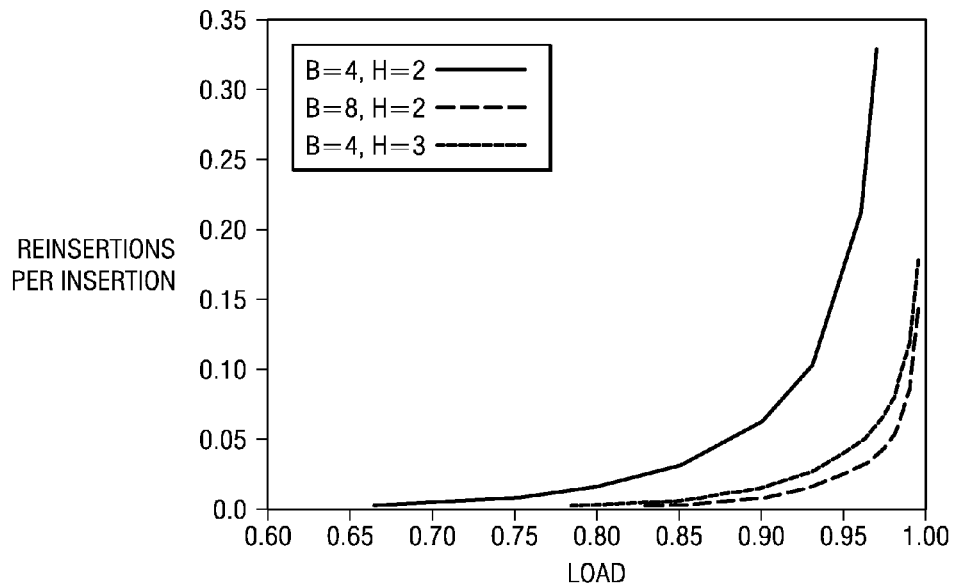
FIG. 10 depicts the average number of re-insertions per insertion versus load in accordance with an illustrative embodiment.

FIG. 10 depicts the average number of re-insertions per insertion versus load in accordance with an illustrative embodiment. The amortized number of re-insertions is very small, below 0.35 even for high loads. The marginal number of re-insertions per insertion which may be estimated as the slope of this graph is also small, at most 12 at the highest load factors in these experiments. These results show that re-insertions will not slow down the build process to a significant degree, except perhaps when one is very close to the failure threshold. Thus, the typical cost of an insertion is approximately the same as the cost of a probe (to determine if the key already exists in the table) together with a comparison of the counts and an assignment of the key and the payload to a slot of the appropriate bucket. The number of cache misses is the same as for a probe.

As an example of a probe process, the probe performance of hashing is illustrated on two architectures, namely the Pentium® 4 and the Cell BE SPE. The exemplary code is implemented in C. On the Pentium® 4, an Intel®'s icc compiler (version 9.0) is used, which generated code that was slightly more efficient than gcc. On the Cell BE, IBM®'s xlc compiler (version 050418y) is used for the SPE. Maximum optimization was employed.

The first code version is a "generic" probe that implements chained-bucket hashing as described in FIG. 1, with bucket size S set to 64 bytes. The code contains no architecture-specific optimizations, and compiles on both the Pentium® 4 and the Cell BE SPE. The second code version is similar to the first, except that it implements an open addressing hash table with quadratic probing rather than chained-bucket hashing. Both hash table variants are populated with a load factor of 0.75. A quadratic probing with a load factor of 0.1 is also considered, which represents trading of space for improved probe time.

The two other code versions are splash table probes implemented as described previously. One of these versions uses SPE-specific SIMD instructions, while the other uses Pentium®-4-specific SSE2 instructions. In both cases, these instructions were invoked using compiler intrinsics. When the table size fits in 16 bits, specialized versions of the hash and probe routines are used to save several instructions. For the SPE implementation, the table size is limited to the size of the local store, which is 256 KB. All code variants use multiplicative hashing.

The Cell BE SPE code is evaluated using IBM's spusim, which simulates the Cell BE SPE architecture, and is close to cycle-accurate. (When the code is executed on a real Cell BE processor, the number of cycles taken was within a few percent of what the simulator predicted.) Spusim allows a user to determine how cycles were spent during program execution. The Pentium® 4 code is run on a 1.8 GHz Pentium® 4 that is used solely for these experiments. The machine runs Linux™ 2.6.10 and has a 256 KB L2 cache, an 8 KB L1 data cache, and 1 GB of RAM. The L2 latency, L1 latency, and translation lookaside buffer (TLB) miss latency of the machine were 273, 17, and 56 cycles respectively. During code execution, the perfctr tool measured the values of hardware performance counters. The branch misprediction penalty of the Pentium® 4 is assumed to be 20 cycles. (It is 18 cycles on the Cell BE SPE.)

When presenting the results on the Pentium® 4, it is interesting to note that the effects of cache misses, branch mispredictions, and TLB misses on the final number of cycles needed, multiplying the counts for these events (obtained using the performance counters) by the latencies mentioned above. While this gives a reasonably accurate measure of the impact of branch mispredictions, it may significantly overestimate the impact of cache misses and TLB misses because (a) they may be overlapped with other work, including other misses, and (b) multiple references to the same cache-line may be flagged as a miss multiple times even though a single miss penalty is paid. As a result of this overestimation, it may appear as though the aggregate L2 cache miss penalty exceeds the total execution time, an obviously inconsistent result. Nevertheless, it is very difficult to measure the overlapping and overcounting effects mentioned above to get a better estimate. Therefore, the results in this overestimated form are included, with the understanding that the true impact is some fraction of the plotted number of cycles.

All Pentium® 4 performance numbers are reported in cycles. The Pentium® 4 machine is not the most recent model; the latest Pentium® 4 machines run at 3.4-3.8 GHz. Thus, the measured cache miss penalty may be lower than what a user would experience on machines with a faster clock rate. The Cell BE SPE is designed to operate at frequencies between 3 and 5 GHz. Thus, it is reasonable to assume that a cycle on an SPE is roughly the same amount of time as a cycle on the most recent Pentium® 4 models.

The performance results measured a large number of probes in a tight loop, simulating (part of) the probe phase of a hash join. The number of probes is large enough that probe costs dominate the costs of initialization overheads. For the generic code, probes that are successful are interleaved with probes that are unsuccessful Splash table performance is not sensitive to whether or not the search is successful.

The x-axes of some of the figures presented in these illustrative embodiments represent the total data structure size. This choice makes it easy to see transitions that happen when the table size goes beyond milestones such as the cache capacity. Splash tables may fit more entries into a fixed amount of memory than hash tables. Thus, comparing the two methods at a given data structure size is somewhat biased in favor of hash tables.

Figure 11:
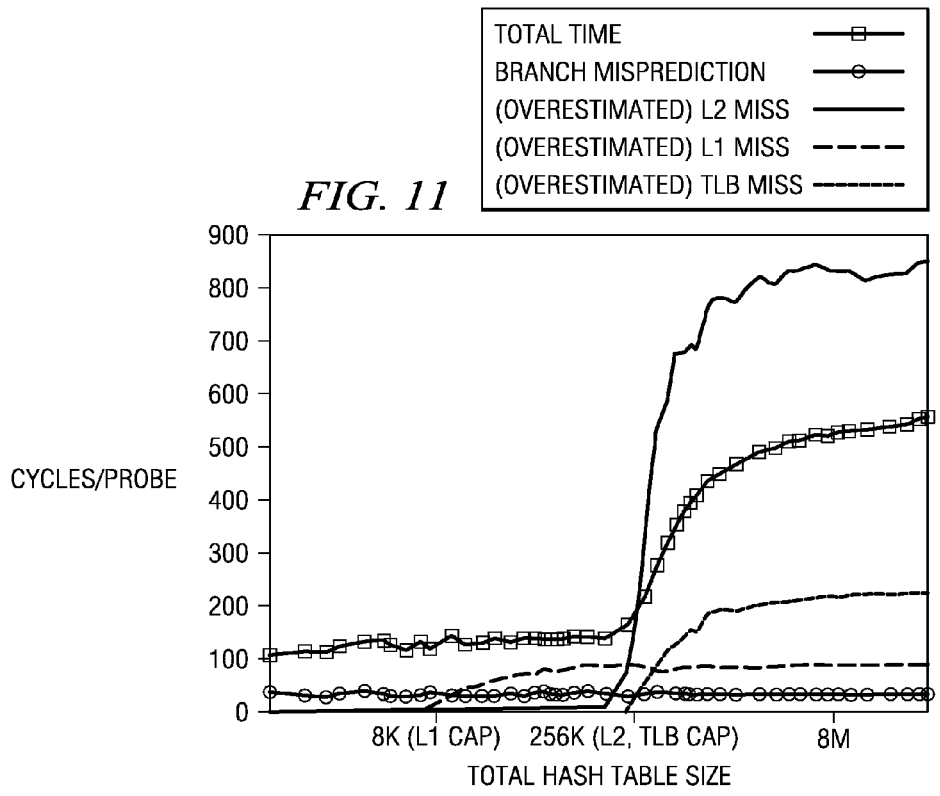
FIG. 11 shows the performance of chained-bucket hashing on the Pentium® 4 in accordance with an illustrative embodiment.

FIG. 11 shows the performance (measured in cycles per probe) of chained-bucket hashing on the Pentium® 4 in accordance with an illustrative embodiment. For tables that fit comfortably in the L2 cache, the performance is between 108 and 135 cycles/probe. However, once the hash table exceeds the L2 cache size of 256 KB (which also coincides with the capacity of the TLB) the cost increases dramatically, exceeding 500 cycles/probe. The branch misprediction penalty does not seem to depend on the table size. For L2-cache resident tables, the branch misprediction penalty accounts for about 20% of the total cycles. The number of instructions retired per probe for these experiments was 55, independent of hash table size.

Figure 12:
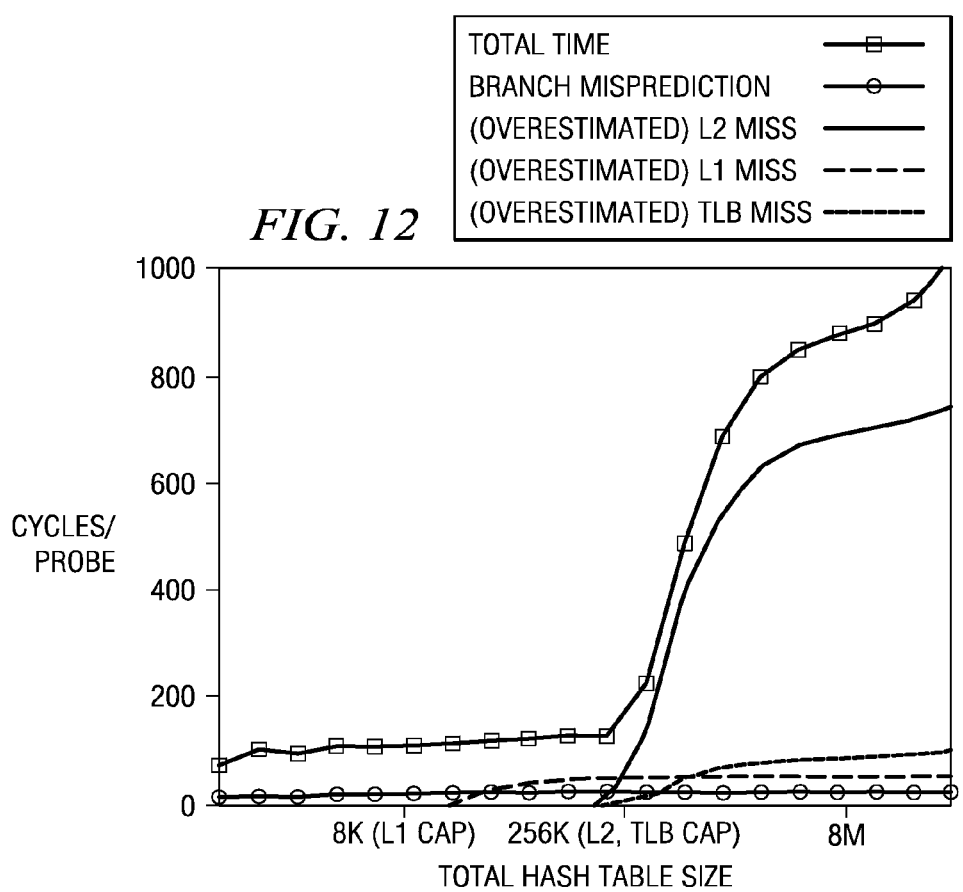
FIG. 12 shows the performance of quadratic probing on the Pentium® 4 in accordance with an illustrative embodiment.

FIG. 12 shows the performance of quadratic probing with a load factor of 0.75 on the Pentium® 4 in accordance with an illustrative embodiment. The performance is slightly better than chained-bucket hashing for small tables, but substantially worse for large tables, since probes may have to touch several cache lines when the initial hash slots are occupied by other keys.

Figure 13:
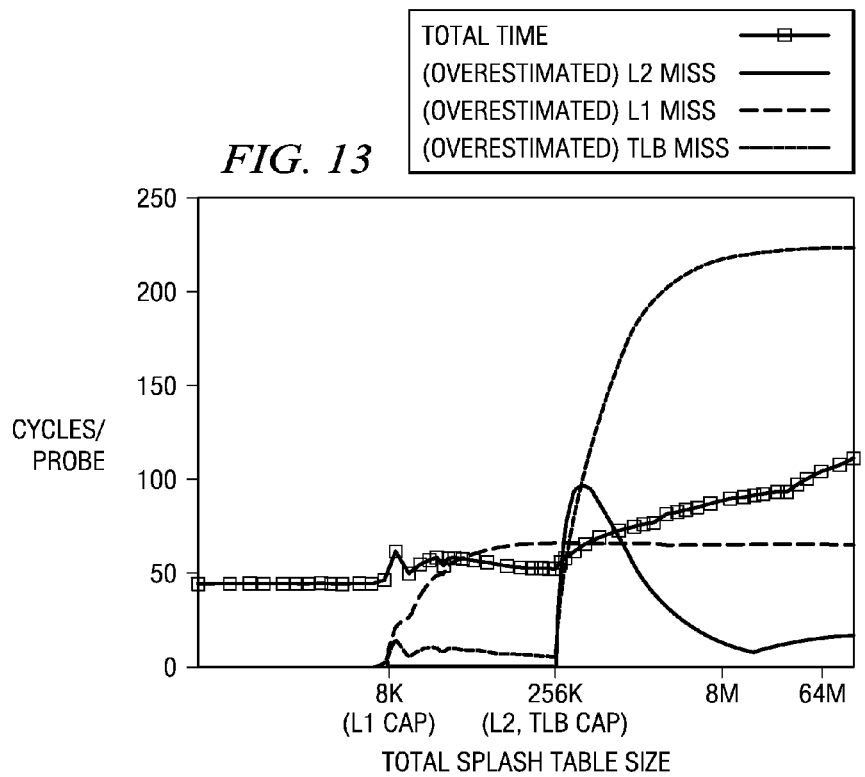
FIG. 13 shows the performance of a splash table on the Pentium® 4 in accordance with an illustrative embodiment.

FIG. 13 shows the performance of a splash table with B=4 and H=2 on the Pentium® 4 in accordance with an illustrative embodiment. The L2 cache miss measurement is anomalous due to a problem with the Pentium® 4 performance counter for such misses, and should be ignored. For tables that fit comfortably in the L2 cache, the performance is between 45 and 63 cycles/probe. Once the splash table exceeds the L2/TLB capacity the cost increases modestly, to about 100 cycles/probe for a 64 MB table. The branch misprediction penalty is essentially zero, and is not shown in the figure. The number of instructions retired per probe for these experiments was 27 when the table size fits in 16 bits, and 33 for larger table sizes.

The difference between FIG. 11 and FIG. 13 is dramatic: a factor of two for small tables, and a factor of four for large tables. The improvement is attributable to several factors:
1. Eliminating the branch misprediction penalty.
2. Reducing the number of instructions needed per probe through the use of loop unrolling and SIMD operations.
3. Overlapping multiple cache misses. The elimination of branching allows the processor to send multiple dependency chains through the instruction pipeline. Each dependency chain may trigger its own cache misses. Branching code tends to cluster all instructions into a single dependency chain.

Figure 14:
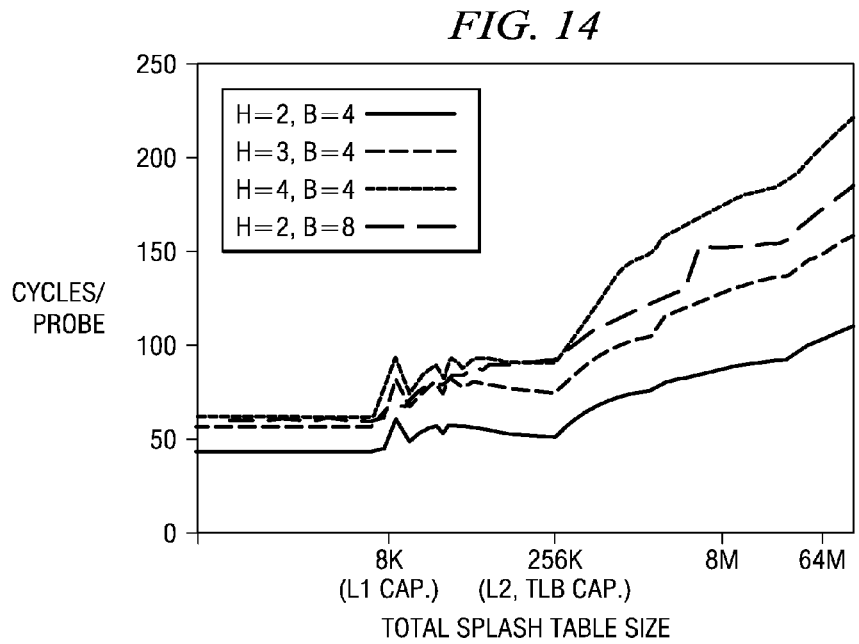
FIG. 14 illustrates a comparison of the total number of cycles taken by various splash table configurations on the Pentium® 4 in accordance with an illustrative embodiment.

FIG. 14 illustrates the comparison of the total number of cycles taken by various splash table configurations on the Pentium® 4 in accordance with an illustrative embodiment. The H=2 and B=4 configuration is about 30% better than the H=3 and B=4 configuration. All configurations beat the chained-bucket hashing method. The small increment in the performance of the B=4 methods at a table size of 2M corresponds to the transition from a 16-bit table size to a 32-bit table size.

As a conclusion to the described exemplary probe process a comparison is made between a 95% full splash table with a 10% full hash table employing quadratic probing. This kind of hash table represents a choice to trade-off space for improved probe time.

Figure 15:
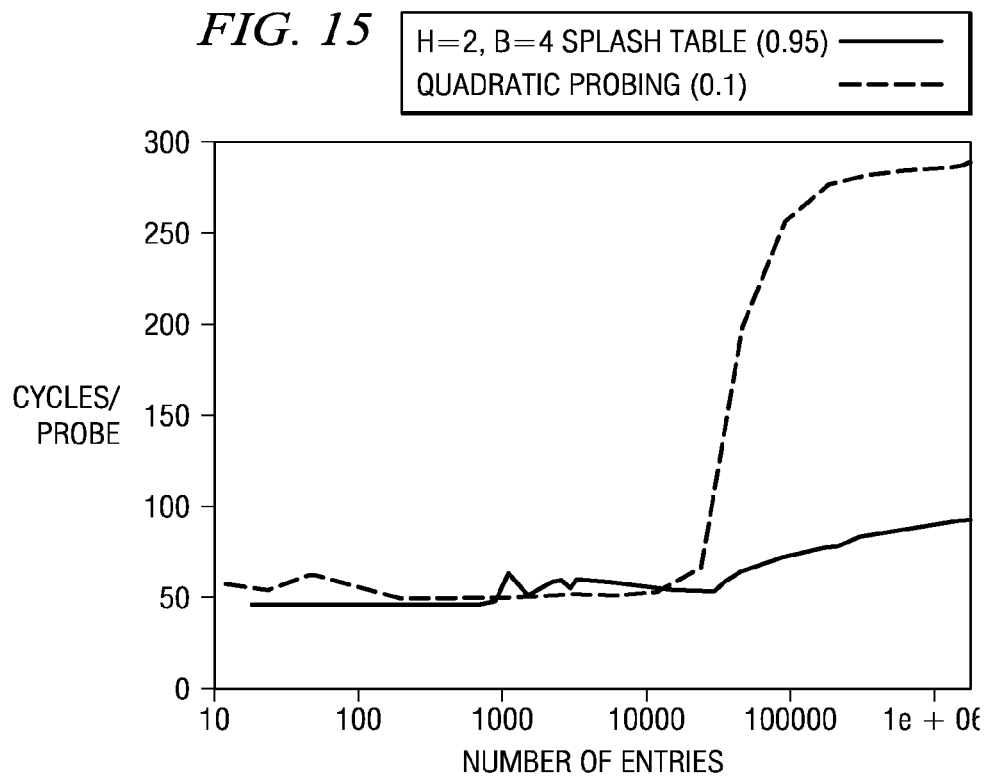
FIG. 15 shows the splash table versus lightly-loaded hash tables on a Pentium® 4 processor in accordance with an illustrative embodiment.

FIG. 15 shows the splash table versus lightly-loaded hash tables on a Pentium® 4 processor in accordance with an illustrative embodiment. For tables smaller than the L2 cache, the time performance of the two methods is comparable, while the hash table uses 9.5 times as much space. However, for tables larger than the L2 cache, splash tables perform about three times better.

Figure 16:
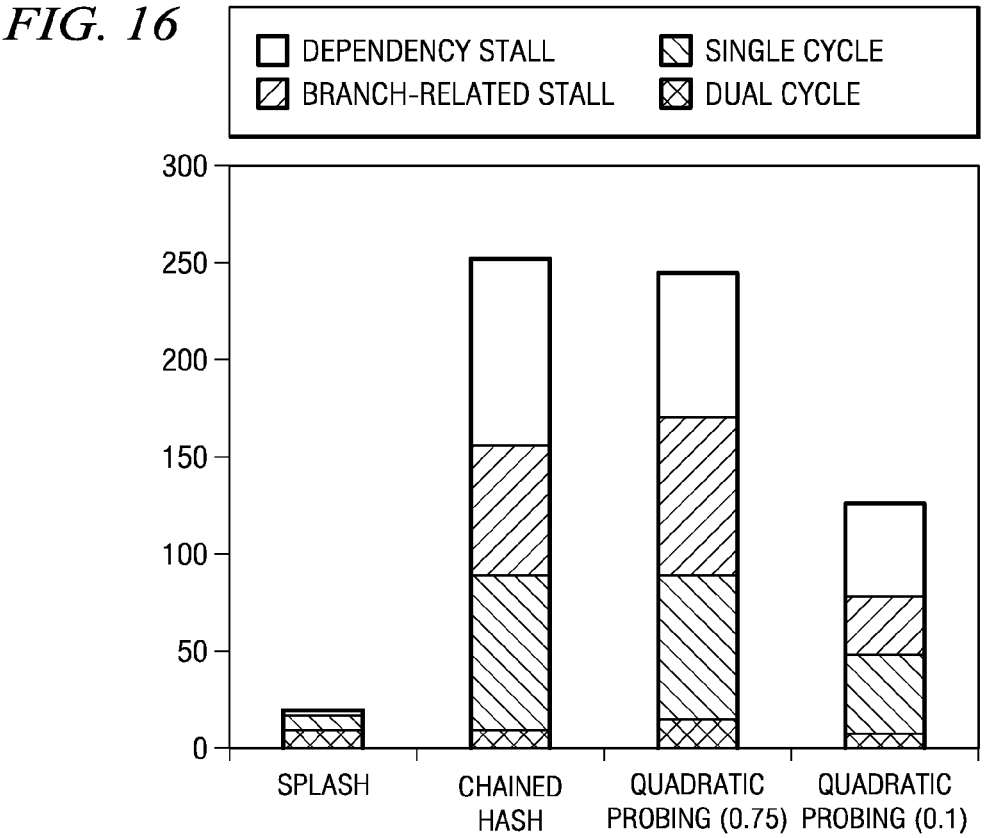
FIG. 16 illustrates a comparison of the total number of cycles taken by a splash table on the Cell BE SPE in accordance with an illustrative embodiment.

FIG. 16 illustrates a comparison of the total number of cycles taken by a splash table with H=2 and B=4, and the two hashing methods on the Cell BE SPE in accordance with an illustrative embodiment. Since the SPE has no caching mechanism, the performance is not sensitive to the hash table size. The configuration shown corresponds to a splash table of size 128 KB, and a hash table of size 155 KB containing the same number of entries. (Recall that the SPE has only 256 KB of local memory.) The total number of instructions per probe for the splash table is 29, comparable to that for the Pentium® 4. These 29 instructions are executed in 21 cycles (compared to 54 for the Pentium® 4). The SPE has two execution pipelines that may execute memory operations in parallel with computation. About half of the useful cycles were spent executing two instructions ("dual cycle" in FIG. 15). A deeper comparison of the Cell BE SPE and the Pentium® 4, will be described later. The 21 cycles for the splash table is an order of magnitude better than the 250 cycles needed for the hash table.

For the chained-bucket hash table, 125 instructions per probe were needed, double that of the Pentium® 4. The Cell BE SPE has very simple branch-prediction logic that (in the absence of compiler-generated hints) predicts that a conditional branch will not succeed. The SPE therefore suffers a higher misprediction penalty than the Pentium® 4, as may be seen in FIG. 16. The final component of the time taken for the hash table is the dependency-related stalls. Because the code branches often, it effectively becomes a single dependency chain. If an instruction takes 7 cycles to complete, and the next instruction needs to know the result of the first instruction, then no work may be done until the first instruction completes. The SPE does not execute code out-of-order. In contrast, the splash table implementation allows the compiler to interleave instructions from several consecutive probes. Because each probe is independent, there are far fewer dependency-induced stalls. The results for quadratic probing are similar to those for chained-bucket hashing. Even with a load factor of 0.1, meaning that the table uses almost 10 times as much space as the splash table, the performance is still five times worse.

While performance graphs have not be included for other splash table configurations on the SPE, for completeness a mention is made that the H=3 and B=4 table took 26 cycles/probe, the H=4 and B=4 table took 31 cycles/probe, and the H=2 and B=8 table took 27 cycles/probe.

The performance results shown so far used the xlc compiler with no special performance tuning beyond inline hints and using the maximum optimization level. Even better probe results were able to be obtained by forcing the compiler to unroll eight copies of the inner probe loop rather than four.

It appears that on conventional code such as chained-bucket hashing, the Pentium® 4 outperforms a Cell BE SPE by a factor of two, assuming the same clock frequency. Yet for specialized code such as the splash table code that is free of branches, the SPE outperforms the Pentium® 4 by a factor of 3.5. Thus, a question may be asked of how is it that a Cell BE SPE may execute 29 instructions in 21 cycles, while the Pentium® 4 executes 27 instructions in 54 cycles for a table of the same size?

A small part of the story is L1 cache misses which cost 17 cycles on the Pentium® 4, while the SPE's local memory latency is just 6 cycles. However, even for L1-cache resident datasets, the Pentium® 4 takes 45 cycles per probe for 27 instructions.

The Cell BE SPE may sometimes execute two instructions in a single cycle, and may issue at least one SIMD instruction on each cycle. On the Pentium® 4, in contrast, SSE2 instructions other than a load/store require at least two cycles before another SSE2 instruction may be executed.

A key difference between the two architectures is the issue of dependency stalls. By examining the assembly code for the two architectures, a user may verify that in both cases the compiler has unfolded a number of probe operations (four, in this case) within the inner loop. These probe operations may be interleaved with one another. On the Cell BE SPE, this interleaving is effective at reducing dependency stalls. Because the SPE has 128 SIMD registers available, intermediate results may be kept in registers while other probes are being processed, making each probe independent of the others. In the actual splash-probe tests, between 57 and 78 registers were used, depending on B and H.

The Pentium® 4, in contrast, has only eight SIMD registers available in 32-bit mode. As a result, interleaving of probe operations is not as effective. The compiler has two choices, neither of which is ideal. Operations could store their results in memory to avoid a register conflict between probes, but memory operations are more expensive than register operations. Alternatively, operations could use registers, but different probes within the loop become dependent because they need to use the same small set of registers. This forced sharing leads to dependency stalls.

In some applications, keys and/or payloads are more naturally mapped to 64-bit or 128-bit quantities. To investigate the effects of key and payload size, a version of splash tables with 64-bit keys and 64-bit payloads was implemented. To hash a (32n)-bit key, each 32-bit component of the key is separately hashed using multiplicative hashing (with different randomly chosen multipliers), and XOR the n hash values together.

On the Pentium® 4 with H=2, two separate hash computations are required since the Pentium® 4 implementation performs full 32-bit multiplication to generate a 64-bit result. On the Cell BE SPE with H=2, one hash computation suffices since 16-bit multiplication to 32-bit values allows four hash values in one SIMD vector. In both architectures, keys and payloads are explicitly represented as 64-bit quantities; two values fit in a 128-bit SIMD vector.

On the Cell BE SPE processor, using a table that occupies most of the local store, the time taken was 31 cycles/probe for H=2 and B=4 and 23 cycles/probe for H=2 and B=2. These numbers represent a slowdown of roughly 40% and 90%, respectively, relative to the (hand-tuned) 32-bit probe at H=2 and B=4. There is a time-space trade-off here, since with B=4 a splash table may reach over 97% occupancy, while with B=2 the occupancy limit is about 89%.

On the Pentium® 4, the slowdown of the 64-bit probe relative to the 32-bit case with H=2 and B=4 was similar: a 60% slowdown for H=2 and B=2, and a 90% slowdown for H=2 and B=4. To get these numbers for the Pentium® 4, however, the probe code was slightly changed so that the probe keys were generated in SSE registers rather than standard registers. The original code generated probes in standard registers and/or memory. There is no direct way to load a 64-bit value into an SSE register without going through memory. As a result, there were additional memory references in the inner loop competing for the small number (four) of allowed outstanding memory requests. Because of these additional requests, there was substantially less overlapping of memory latency, and there was a slowdown by more than a factor of three relative to the 32-bit case.

Splash tables have also been implemented using 128-bit keys and 32-bit payloads, on both the Cell BE SPE and the Pentium® 4.

Figure 17:
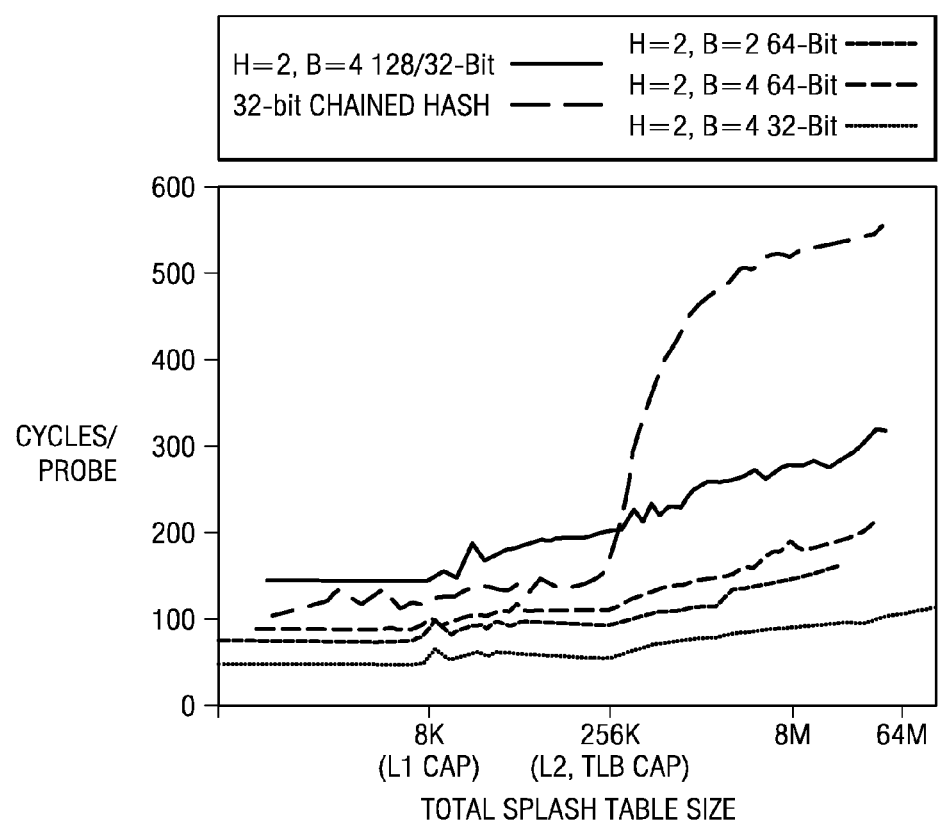
FIG. 17 illustrates the performance results for longer keys and/or payloads on a Pentium® 4 processor in accordance with an illustrative embodiment.
Figure 18:
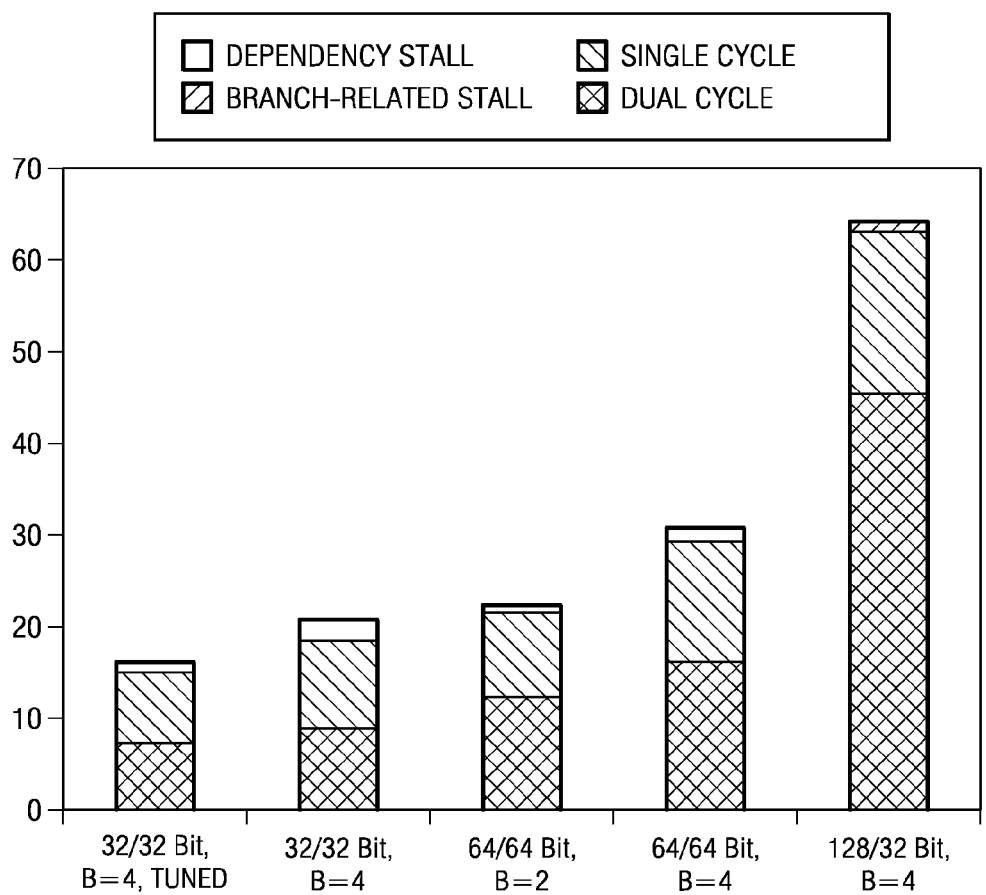
FIG. 18 illustrates the performance results for longer keys and/or payloads on a Cell BE processor in accordance with an illustrative embodiment.

FIG. 17 illustrates the performance results for longer keys and/or payloads on a Pentium® 4 processor in accordance with an illustrative embodiment. FIG. 18 illustrates the performance results for longer keys and/or payloads on a Cell BE processor in accordance with an illustrative embodiment.

In FIG. 17, the performance of 32-bit chained-bucket hashing is included to aid comparison. It is clear simply by comparison with the 32-bit results for standard hashing methods (representing a lower bound for the 64-bit and 128-bit results) that (a) splash tables would outperform regular hash tables for 64-bit data for all table sizes, and (b) that splash tables would outperform hash tables for 128-bit keys on tables larger than the L2 cache.

Figure 19:
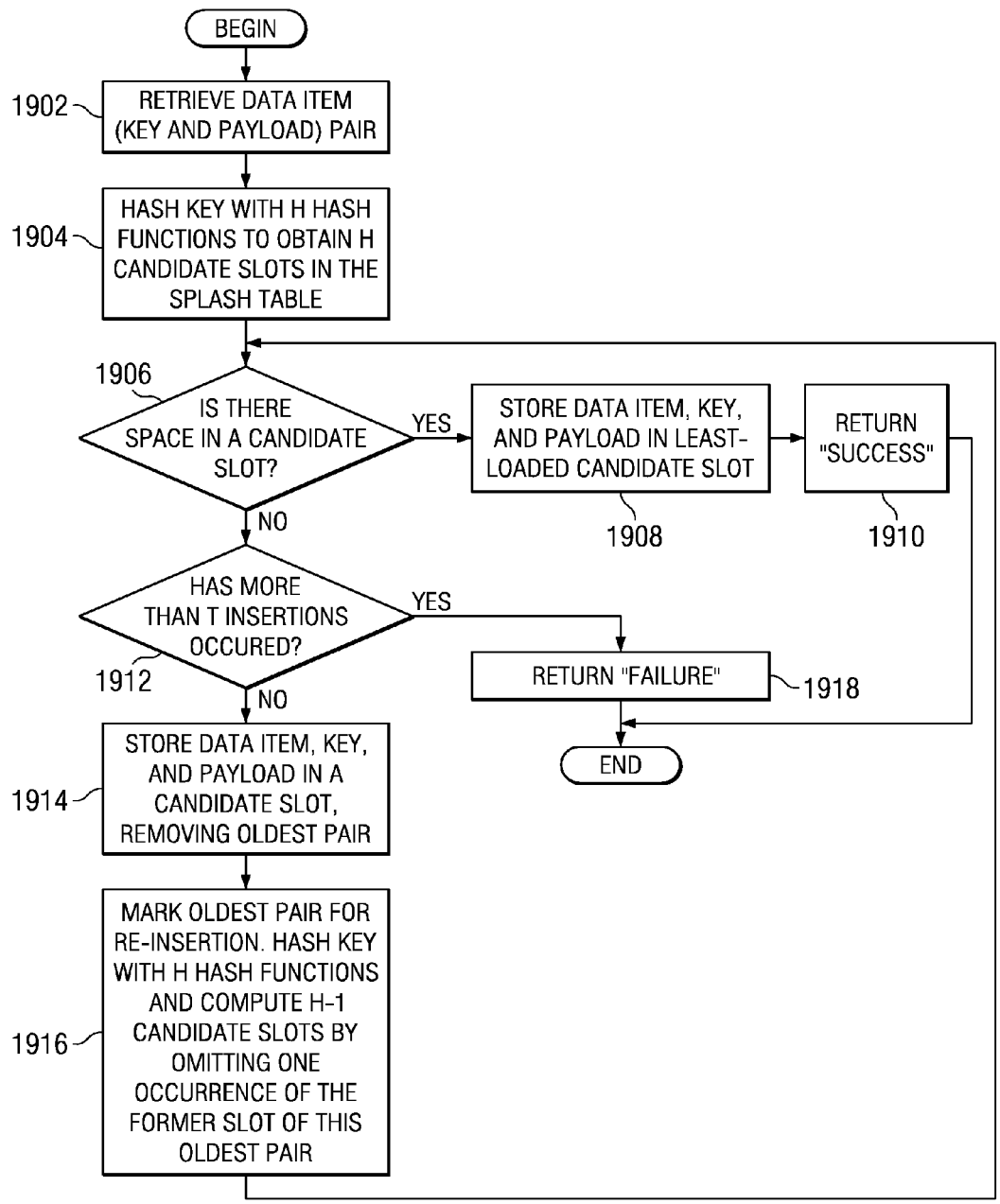
FIG. 19 is a flowchart of the operation to create an efficient hashing scheme for a processor in accordance with an illustrative embodiment.

FIG. 19 is a flowchart of the operation to create an efficient hashing scheme for a processor in accordance with an illustrative embodiment. With regard to the following description a candidate slot may be considered a memory location. As the operation begins, a data item that includes a key and payload pair is retrieved (step 1902). A computation is made that hashes the key with H hash functions to obtain H candidate slots in a splash table (step 1904). A determination is made as to whether there is space in some candidate slot (step 1906). If there is space, the least full slot is selected, then the data item, key, and payload pair are stored into the selected candidate slot (step 1908) and a "success" response is returned (step 1910), with the operation ending thereafter.

If at step 1906 there is no space in any candidate slot, a determination is made if more than T insertions has occurred, were T is a preset value (step 1912). If there has been less than or equal to T insertions, the data item, key, and payload are stored into an occupied candidate slot and the oldest pair is removed from that slot (step 1914). The oldest pair is marked for re-insertion into the splash table (step 1916) and the operation returns to step 1906. When re-inserting the oldest pair, the algorithm does not consider its previous slot as a candidate slot. If at step 1912 there has been more than T insertions, a "failure" response is returned (step 1918), with the operation ending thereafter.

Past work has shown that extensions of cuckoo hashing may achieve good space utilization. However, it has typically been assumed that these schemes perform no better than (and probably worse than) conventional hash tables since they require additional memory references and hash evaluations. The main contribution of these illustrative embodiments is to show that a user may achieve both superior space utilization and superior probe time for bulk probes of small keys and payloads.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for retrieving data items in a computer, the computer implemented method comprising:
   computing a plurality of hash functions of data values in a probe key;
   determining a corresponding memory location for each of the plurality of hash functions of data values in the probe key;

examining stored data items in each memory location to determine a presence of a match with the probe key, wherein each memory location stores a plurality of stored data items; and responsive to a match between a stored data item and the probe key, returning a payload of the matching stored data item, wherein the computing, determining, examining, and returning steps are free of conditional branch instructions.

2. The computer implemented method of claim 1, wherein searching the plurality of stored data items is performed using single instruction multiple datastream instructions.

3. The computer implemented method of claim 1, wherein single instruction multiple datastream instructions are used to compute multiple hash functions simultaneously.

* * * * *